(12) United States Patent
Becker et al.

(10) Patent No.: US 7,561,392 B2
(45) Date of Patent: Jul. 14, 2009

(54) INTRINSICALLY SAFE DATA TRANSMISSION DEVICE

(75) Inventors: Udo Becker, Duisburg (DE); Manfred Scharfenberg, Unna (DE)

(73) Assignee: Cooper Crouse-Hinds GmbH, Soest (DE)

( * ) Notice: Subject to any disclaimer, the term of this patent is extended or adjusted under 35 U.S.C. 154(b) by 101 days.

(21) Appl. No.: 10/596,238

(22) PCT Filed: Dec. 3, 2004

(86) PCT No.: PCT/EP2004/013778

§ 371 (c)(1),
(2), (4) Date: Dec. 20, 2006

(87) PCT Pub. No.: WO2005/054966

PCT Pub. Date: Jun. 16, 2005

(65) Prior Publication Data

US 2007/0223180 A1    Sep. 27, 2007

(30) Foreign Application Priority Data

Dec. 5, 2003   (DE) .................. 103 56 985

(51) Int. Cl.
| | | |
|---|---|---|
| H02H 7/00 | (2006.01) | |
| H02H 3/00 | (2006.01) | |
| H02H 3/20 | (2006.01) | |
| H02H 9/04 | (2006.01) | |
| H02H 3/08 | (2006.01) | |
| H02H 9/02 | (2006.01) | |
| H02H 5/04 | (2006.01) | |
| G01V 3/00 | (2006.01) | |
| G08C 19/04 | (2006.01) | |
| G05B 11/01 | (2006.01) | |
| G05B 19/18 | (2006.01) | |
| G01R 15/00 | (2006.01) | |
| G05D 3/12 | (2006.01) | |
| G05D 5/00 | (2006.01) | |
| G05D 9/00 | (2006.01) | |
| G05D 11/00 | (2006.01) | |
| G05D 17/00 | (2006.01) | |
| G06F 11/00 | (2006.01) | |

(52) U.S. Cl. .................. 361/62; 361/88; 361/91.5; 361/93.1; 361/103; 340/853.2; 340/870.39; 700/19; 700/21; 700/65; 700/286; 702/57; 702/188

(58) Field of Classification Search .................. 700/19, 700/21, 65, 150, 286; 702/2, 57, 104, 188, 702/183; 340/632, 853.1, 853.2, 870.01, 340/870.39; 361/62, 88, 93.1, 103, 832, 361/91.5

See application file for complete search history.

(56) References Cited

U.S. PATENT DOCUMENTS

| | | | | |
|---|---|---|---|---|
| 3,631,264 | A * | 12/1971 | Morgan | 327/309 |
| 4,796,159 | A * | 1/1989 | Miksche | 361/832 |
| 4,860,151 | A * | 8/1989 | Hutcheon et al. | 361/91.5 |
| 5,448,231 | A * | 9/1995 | Takezoe et al. | 340/870.39 |
| 5,583,764 | A * | 12/1996 | Nail et al. | 702/2 |
| 5,712,631 | A * | 1/1998 | Lewis et al. | 340/853.1 |
| 5,835,534 | A * | 11/1998 | Kogure | 375/257 |
| 5,838,589 | A * | 11/1998 | Nail et al. | 700/286 |
| 5,936,514 | A * | 8/1999 | Anderson et al. | 323/234 |
| 6,154,683 | A * | 11/2000 | Kessler et al. | 700/150 |
| 6,169,488 | B1 * | 1/2001 | Ketler | 340/632 |
| 6,404,609 | B1 * | 6/2002 | Mansfield et al. | 361/103 |
| 6,574,652 | B2 * | 6/2003 | Burkhard | 718/1 |
| 6,614,634 | B1 * | 9/2003 | Westerfeld et al. | 361/62 |
| 6,822,431 | B2 * | 11/2004 | Masuda et al. | 324/72 |
| 6,859,755 | B2 * | 2/2005 | Eryurek et al. | 702/183 |
| 6,885,949 | B2 * | 4/2005 | Selli | 702/57 |
| 6,998,998 | B2 * | 2/2006 | Thomas | 340/853.1 |
| 7,233,745 | B2 * | 6/2007 | Loechner | 398/128 |
| 2002/0097031 | A1 | 7/2002 | Cook et al. | |

FOREIGN PATENT DOCUMENTS

| | | |
|---|---|---|
| DE | 199 10 409 | 11/1999 |
| EP | 1 202 139 | 5/2002 |
| JP | 07015450 A * | 1/1995 |

| WO | WO96-31815 | 10/1996 |
| WO | WO 2005031481 A2 * | 4/2005 |

OTHER PUBLICATIONS

U. Johannsmeyer, "Fieldbus for Process Automation in Hazardous Locations Actual Developments," *International Conference on Explosion Safety in Hazardous Areas,* Conference Publication No. 469, Nov. 11-13, 1999, pp. 61-67.

Seimens AG, "Explosionsschutz A5E00265041," *Automation And Drives, Process Instrumentation And Analytics,* Document No. XP002317461, Oct. 2003, pp. 1-53.

* cited by examiner

*Primary Examiner*—Crystal J Barnes Bullock
(74) *Attorney, Agent, or Firm*—Fish & Richardson P.C.

(57) ABSTRACT

A process control system (1) comprises at least one process control computer (2) and field units (4) connected thereto via a bus system. An, in particular, intrinsically safe data transmission device (5) is connected between the process control computer and the assigned field units. This data transmission device comprises a data adaptation device (6) and a data distributing device (7). In order to be able to connect more field units per data adaptation device while simultaneously reducing the costs per field unit, the data adaptation device (6) and its assigned supply devices (8) have an explosion-proof design, and each supply device is connected to the data distributing devices via an explosion-proof line, whereby these data distributing devices or field units connected thereto have a barrier device for limiting the applied power.

16 Claims, 3 Drawing Sheets

INTRINSICALLY SAFE DATA TRANSMISSION DEVICE

Figure 1:
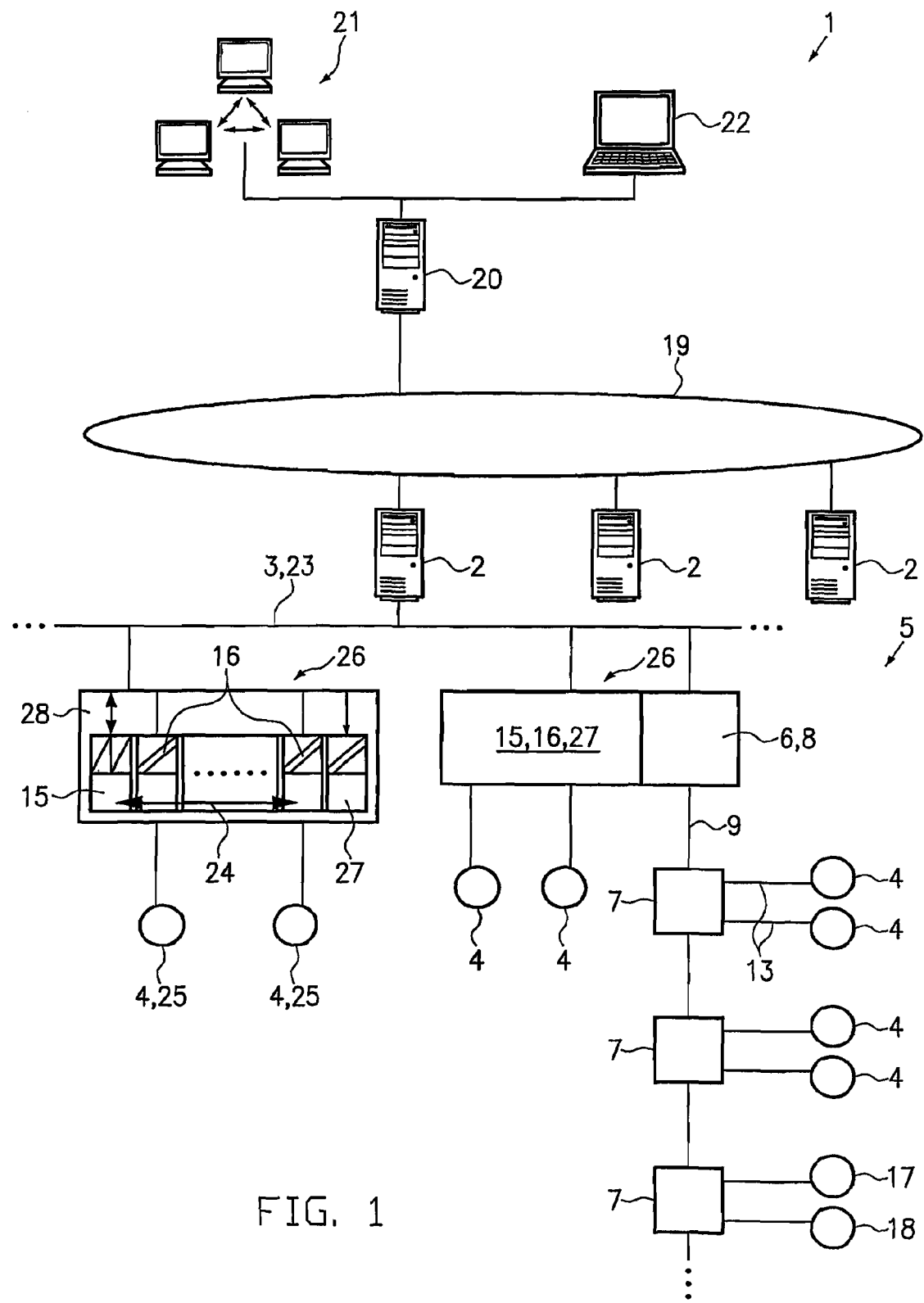

The invention relates to a data transmission device with at least one data adaptation device and one data distributing device, which is connected between at least one process control computer and field units connected thereto via a bus system, wherein the process control computer and assigned field units are part of a process control system and the data transmission device is, in particular, intrinsically safe.

Such a process control system is known from practical applications and serves, for example, data transmission between field units forming a sensor system and the assigned process control computer. As a rule, data transmission takes place digitally via a corresponding bus system. Because the field units communicate at low baud rates because of cost considerations, and otherwise the communication in the control system takes place at high baud rates, a data transmission device is connected between the process control computer and assigned field units. This comprises at least one data adaptation device and one data distributing device. A corresponding matching of the data for transmission between the sensor system and the control system, in particular with respect to the different transmission rates, is handled by the data adaptation device. The data distributing device is, for example, a patch panel connected between the data adaptation device and the field units. This patch panel distributes the data, which is usually supplied from the data adaptation device via a multicore cable, to, for example, twin core cables, so that the data can continue to the appropriate field units.

As a rule, at least the data distributing device and field unit are arranged in an explosion-proof area (Ex area). The connections in such an Ex area are formed so that they are intrinsically safe (Ex-i) and it is only possible to work with limited power in an electric circuit.

Detrimental in the case of the known data transmission device is that in practical application, a maximum of four field units can be connected to an electric circuit, i.e., to a data adaptation device. Due to this fact, the costs per field unit increase.

The basis of the invention is formed by the object of improving a data transmission device of the type named at the beginning so that it is possible to connect more field units per data adaptation device while simultaneously reducing the costs per field unit.

This object is solved in connection with the feature of the generic term of patent Claim 1 by means of forming the data adaptation device and its assigned supply devices so that they are explosion proof and so that each supply device is connected to the data distributing devices via an explosion-proof line, whereby these data distributing devices or the field units connected thereto have a barrier device for limiting the applied power. According to the invention, the data adaptation devices and assigned supply devices are arranged in the Ex area. The supply device makes possible the certain electrical isolation according to Ex criteria and, because the intrinsically safe signal matching is moved to the data distributing device or field unit, corresponding outputs of the supply devices do not have to be executed in an intrinsically safe manner. In this way, the load per electric circuit can be considerably higher than is the case with the state of the art, and it is possible to connect a large number of field units, for example, 40 to 50 sensors, per electric circuit. As a result, the costs sink considerably, as does the expenditure for cable installation, particularly between the data adaptation device and the field units.

For simple arrangement and integration into already existing systems in the Ex area, the data adaptation device and/or supply device can be inserted into a backwall plate having a field bus for communication among the devices and with the process control computer.

Such a backwall plate with corresponding plug-in modules is described, for example, in WO 96/31815. The backwall plate is constructed modularly and can easily be expanded to allow additional mounting of the data adaptation device and the supply device. Alternatively, modules already existing on the backwall plate can be replaced by the data adaptation device or the supply device.

In order to match data both with respect to the data transmission rate and/or the data format or the like, the data adaptation device can have a data matching and/or data converting circuit.

In order to form the data adaptation device and/or supply device as plug-in modules for the above-mentioned backwall plate (backplane) and arrange them in the Ex area in a simple way, these devices can be encapsulated in a way that is pressure-proof (Ex-d).

It is pointed out here that more than one supply device can be connected to each data adaptation device, so that in this way, the expenditure for the cable installation is again reduced, while the number of field units per data adaptation device is simultaneously increased to 100 or more field units.

If the supply device has at least one output with extended safety (Ex-e), various data distributing devices can easily be connected in series to this output, and each data distributing device can be connected to a number of field units via intrinsically safe (Ex-i) lines. Such Ex-i lines are, however, only necessary if the data distributing device already has a barrier device.

If the field units are formed without intrinsically safe signal matching, communication between the data distributing device and the field unit can also take place via lines with extended safety (Ex-e).

The barrier device can be formed as a separate component that is assigned to a corresponding data distributing device. Likewise, it is possible for the barrier device to be integrated in the data distributing device or even in the field unit.

Various designs for such barrier devices are known in themselves, and the barrier device can advantageously be a safety barrier with Zener diodes and/or resistors and/or fuses.

A simply constructed and economically priced embodiment for a data distributing device is a junction box or a terminal box correspondingly executed in Ex-e or Ex-i.

In order to allow a high transmission rate for data communication between field unit and the process control computer via the data adaptation device, the bus system can be a bus system such as the Profibus or the like, particularly between the process control computer and the data adaptation device or the backwall plate on which the data adaptation device is mounted. Such bus systems are completely standardised in the European norm EN 50170.

As a rule, a bus interface module is provided for connecting the backwall plate to the bus system, wherein this bus interface module can likewise be mounted on the backwall plate. Communication with the remaining modules mounted on the backwall plate, such as the data adaptation device and/or the supply device, for example, takes place via this bus interface module, whereby this communication takes place via a local bus.

In order to connect additional field units to the process control computer via the backwall plate, I/O signal matching modules can be mounted on the backwall plate. At least one field unit can be connected to each of these signal matching modules.

Examples of such field units are sensors or actuators, such as thermocouples, measuring transducers, relay outputs or the like, for example.

The entire process control system can have more than only one process control computer (master), whereby each of these process control computers is connected to a number of field units assigned thereto via a corresponding bus system. For communication among these process control computers and between these process control computers and a higher level of the process control system, each process control computer can be connected to a server via a high-speed data transmission device.

The server mentioned in the preceding can, in turn, be connected to input devices for at least the maintenance and modification of the process control system. Examples of such input devices are operating consoles for an operator or for maintenance personnel. The consoles are operated via the server.

Information on the status of the process control system reaches the master from the field units or sensors via so-called slaves. An example of such a slave is a backwall plate with the modules mounted thereon. The control of the system takes place in the reverse direction, i.e., from the master to the field units, in this case, in particular to the actuators, via the slaves.

The data adaptation device can be used directly as a slave or it can be a part of a slave.

It is pointed out that the I/O signal matching modules serve, in particular, the communication with actuators and data adaptation devices, particularly the communication with sensors as field units.

According to the invention, the result is therefore lower costs per sensor in comparison to a process control system according to the state of the art, the possibility of mounting the data adaptation device and the supply device directly in the Ex area, considerable simplification of the cable installation and the possibility of using already existing bus lines between the safe area and the Ex area. This furthermore leads to a more clearly laid out system and simplified project planning for such a process control system. Finally, it is also advantageous that the data adaptation device and supply device can be integrated into already known I/O systems (see the backwall plates with I/O signal matching modules and bus interface modules according to WO 96/31815).

In the following, advantageous embodiments of the invention are explained in more detail using the figures included with the drawing.

Figure 2:
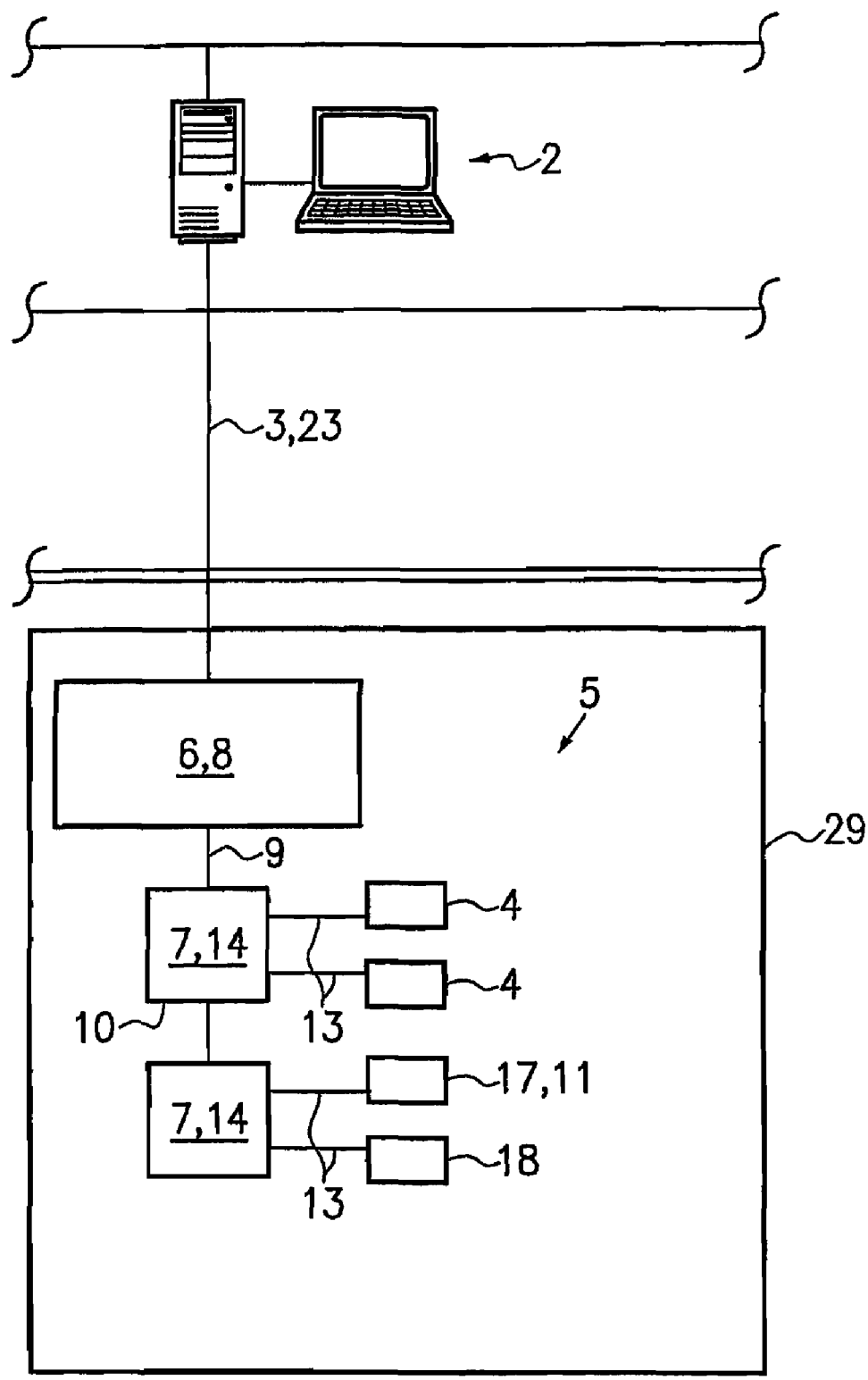

Shown are:

FIG. 1 a basic general view of a process control system according to the invention;

FIG. 2 a detail from FIG. 1, and

Figure 3:
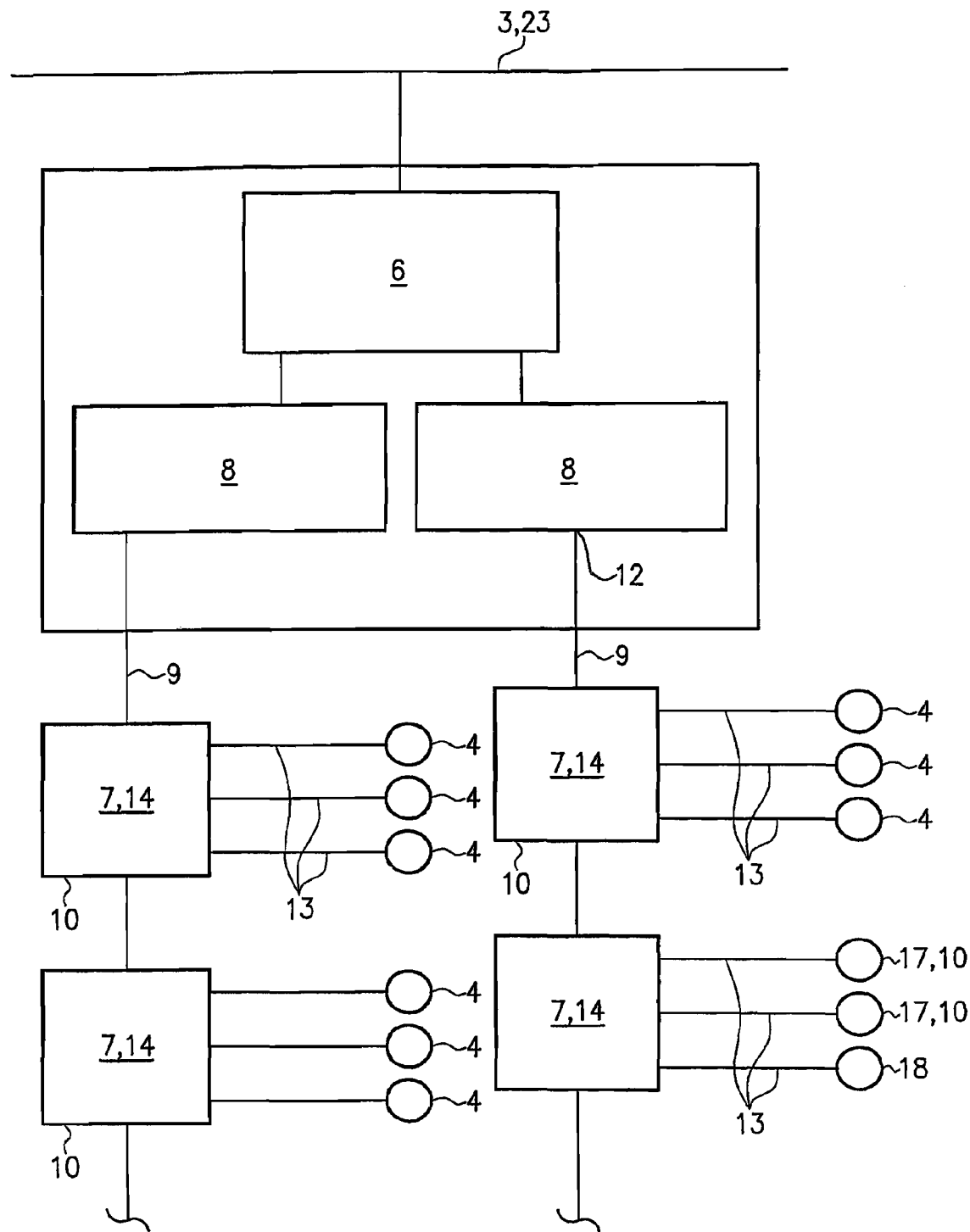

FIG. 3 an enlarged depiction of a detail from FIG. 1, in particular with a data adaptation device and data distributing device according to the invention.

FIG. 1 shows a basic general view of a process control system 1. This has input devices 21 and 22 at the highest level. By means of these input devices 21 and 22, it is possible, for example, for an operator to enter data into the system or for maintenance personnel to retrieve data from the system. The input devices 21, 22 are connected to a server 20. This is connected to process control computers 2, the so-called masters, via a high-speed data transmission device 19, such as a data line with a high data rate, for example.

Each of the masters 2 is connected to a number of so-called slaves 26 of a data transmission device 5 according to the invention via a bus system 3, such as a Profibus formed as a field bus 23, for example.

In turn, the slaves 26 are connected to field units 4 via explosion-proof lines 9. For example, a slave 26 is connected to the field bus 23 by means of a bus interface module 15, whereby the bus interface module 15 can be mounted on a backwall plate 28. Communication with other modules mounted on the backwall plate 28, such as I/O signal matching modules 16 and a power supply module 27, takes place via the bus interface module 15. An actuator 25 as field unit 4, for example, is connected to each of the I/O signal matching modules 16. Communication between the I/O signal matching modules 16 and the bus interface module 15 takes place via a local bus 24. Corresponding power supply lines are, like the local bus 24 for power supply from the power supply module 27, arranged on the backwall plate 28.

Shown in FIG. 1 is an additional slave 26, which comprises, in addition to bus interface module 15 and I/O signal matching module 16 as well as power supply module 27, a data adaptation device 6 with at least one assigned supply device 8. Data received from a system of sensors as field units 4, 17, 18 are matched and converted by means of the data adaptation device 6, in particular with regard to the differing data transmission rate on the field bus 23.

Data distributing devices 7, which are connected in series, are connected to the data adaptation device or the supply device 8 via an explosion-proof line 9. Each of these data distributing devices 7 is connected to the corresponding field units 4, 17, 18 via connection lines 13.

The number of process control computers 2, slaves 26, field units 4, 17, 18 and data distributing devices 7 shown in FIG. 1 is only an example, because a larger number of each of these devices can just as well be present in the process control system according to the invention.

FIG. 2 shows a detail from FIG. 1.

In this case, the data transmission device 5 and, in particular, the data adaptation device 6 are connected to the process control computer 2 directly via the field bus 23. The data transmission device 5 is arranged in an Ex area 29. The corresponding supply device 8 is connected to, for example, the two depicted junction boxes 14 as data distributing devices 7 via the explosion-proof line 9. One of the data distributing devices 7 has a barrier device 10 comprising diodes, resistors or fuses. The connection lines between the data distributing device 7 with barrier device 10 and the corresponding field units 4 is formed by an intrinsically safe (Ex-i) line. The connection between the data distributing device 7 without barrier device and the associated field units 17, 18 is made via line 13 with extended safety (Ex-e).

The field units 4 are formed in a way known in itself, while the field units 17, 18 either have a barrier device 11 or are formed as pressure-proof, encapsulated field units (see field unit 18).

FIG. 3 shows an enlarged detail from FIG. 1 with two supply devices 8 connected to a data adaptation device 6.

Each of the supply devices 8 has an output 12 with extended safety (Ex-e), to which is connected a line 9 with extended safety. A number of junction boxes 14 as data distributing device 7 are connected in series to each of these lines 9. Corresponding field units 4, 17, 18 are connected to each of the junction boxes 14 via connection lines 13.

The junction boxes 14 shown on the left-hand side of FIG. 3 are each formed with a barrier device 10. Correspondingly, the connection lines 13 have an intrinsically safe design and the field units 4 connected thereto are formed in the customary manner.

The preceding applies in an analogous manner to the junction box 14 that is arranged on the right-hand side of FIG. 3 and connected directly to the supply device 8.

The other junction box 14 shown on the right-hand side of FIG. 3 has a barrier device 10. Therefore, the corresponding connection lines 13 are formed with extended safety and the corresponding field units 17, 18 have either a barrier device 10 or are pressure-proof encapsulated (see field unit 18).

In the following, there is a brief explanation, using the figures, of the function of the process control system according to the invention, which can likewise be formed by a control system with programmable memory.

By moving the intrinsically safe signal matching to the data distributing device and/or field units, it is possible, according to the invention, to place a considerably higher load per electric circuit on the supply devices. In this way, it is possible to connect forty to fifty or more sensors per electric circuit, instead of, for example, four sensors per electric circuit. By means of connecting multiple supply devices to a data adaptation device, there is a further multiple increase in the number of sensors per data adaptation device.

The expenditure for wiring the various devices is considerably reduced. All that is necessary from the higher levels of the process control system is one bus line in the Ex area. Data adaptation device, supply device and data distributing devices are all arranged in the Ex area, and the connection to the separate sensors as field units takes place by means of the data distributing devices with barrier devices or data distributing devices without barrier devices. In the case of data distributing devices without a barrier device, such a barrier device is either integrated in the corresponding field unit or the field unit is designed with pressure-proof encapsulation.

Overall, in the process control system with a data transmission device according to the invention, there results considerably lower expenses per sensor, simplification of the cable installation and reduction of the cabling to only a few connections, so that the overall result is a system that is more clearly laid out and simplified project planning for such a system. Furthermore, it is possible to integrate the data adaptation devices and supply devices into existing I/O systems with I/O signal matching module and bus interface module.

The invention claimed is:

1. A data transmission device with at least one data adaptation device and one data distributing device, the data transmission device being connected between at least one process control computer arranged in a non-Ex area and field units connected thereto via a bus system, wherein the process control computer and field units are parts of a process control system and the data transmission device is, in particular, intrinsically safe, and arranged in an Ex area, wherein the data adaptation device and supply devices assigned thereto are formed so that they are explosion-proof and each supply device is connected to the data distributing device via an explosion-proof line, wherein either the data distributing device or the field units connected thereto, which are also arranged in the Ex area, have a barrier device for limiting applied power, which barrier device is arranged in the Ex area.

2. The data transmission device according to claim 1, wherein the data adaptation devices and/or supply devices can be mounted on a backwall plate that has a field bus for communication among the devices and with the process control computer.

3. The data transmission device according to claim 2, wherein I/O signal matching modules can be mounted on the backwall plate.

4. The data transmission device according to claim 1, wherein the data adaptation devices and/or supply devices are encapsulated in an explosion-proof manner.

5. The data transmission device according to claim 1, wherein the supply device has at least one output with extended safety (Ex-e).

6. The data transmission device according to claim 1, wherein the data distributing device and/or field unit is formed for intrinsically safe (Ex-i) signal matching.

7. The data transmission device according to claim 1, wherein the barrier device is integrated in the field unit or in the data distributing device.

8. The data transmission device according to claim 1, wherein the barrier device is a safety barrier with Zener diodes and/or resistors and/or fuses.

9. The data transmission device according to claim 1, wherein the data distributing device and field unit are connected by means of connection lines rated as intrinsically safe (Ex-i) or having extended safety (Ex-e).

10. The data transmission device according to claim 1, wherein the data distributing device is a junction box.

11. The data transmission device according to claim 1, wherein the bus system between the process control computer and backwall plate or bus interface module on the backwall plate is a Profibus.

12. The data transmission device according to claim 1, wherein the data adaptation device has a data matching and/or data converting circuit.

13. The data transmission device according to claim 1, wherein the field units are sensors and/or actuators.

14. The data transmission device according to claim 1, wherein the process control computer is connected to a server via a high-speed data transmission device.

15. The data transmission device according to claim 14, wherein the server is connected to an input device for, at least, maintenance and modification of the process control system.

16. The data transmission device according to claim 1, wherein the data adaptation device is connected directly to the process control computer.

\* \* \* \* \*